(12) United States Patent
Pöyhtäri (10) Patent No.: US 10,713,841 B1
(45) Date of Patent: Jul. 14, 2020

(54) SYSTEM FOR GENERATING POINT CLOUD MAP AND METHOD THEREFOR

(71) Applicant: Unikie Oy, Tampere (FI)

(72) Inventor: Tuomas Pöyhtäri, Oulu (FI)

(73) Assignee: Unkie Oy, Tampere (FI)

( * ) Notice: Subject to any disclaimer, the term of this patent is extended or adjusted under 35 U.S.C. 154(b) by 0 days.

(21) Appl. No.: 16/251,221

(22) Filed: Jan. 18, 2019

(51) Int. Cl.
- *G06T 17/05* (2011.01)
- *G06T 3/00* (2006.01)
- *G01S 17/89* (2020.01)
- *G05D 1/00* (2006.01)

(52) U.S. Cl.
CPC .............. *G06T 17/05* (2013.01); *G01S 17/89* (2013.01); *G05D 1/0088* (2013.01); *G06T 3/0068* (2013.01); *G05D 2201/0213* (2013.01); *G06T 2200/08* (2013.01)

(58) Field of Classification Search
CPC ... G06T 17/05; G06T 3/0068; G06T 2200/08; G01S 17/89; G05D 1/0088; G05D 2201/0213
See application file for complete search history.

(56) References Cited

U.S. PATENT DOCUMENTS

| | | | |
|---|---|---|---|
| 9,513,130 B1* | 12/2016 | Boggs | G01C 21/165 |
| 2017/0046840 A1* | 2/2017 | Chen | G06K 9/4604 |
| 2018/0203112 A1* | 7/2018 | Mannion | H04R 1/406 |

* cited by examiner

*Primary Examiner* — Xilin Guo
(74) *Attorney, Agent, or Firm* — Ziegler IP Law Group LLC (57) ABSTRACT

A system for generating a point cloud map of one or more objects in real-world environment. The system including data acquisition device for acquiring plurality of data points representing objects, wherein data acquisition device is configured to acquire first set of data points for objects from first position to generate first point cloud, and acquire second set of data points for objects from second position to generate second point cloud, a server arrangement including a receiving module configured to receive first point cloud and second point cloud, registration module to register received first point cloud and received second point cloud to generate a point cloud pair which is aligned and data processing module to determine quality score for generated point cloud pair, compare determined quality score with predefined threshold value, and generate point cloud map if determined quality score is less than a predefined threshold value.

14 Claims, 6 Drawing Sheets

SYSTEM FOR GENERATING POINT CLOUD MAP AND METHOD THEREFOR

TECHNICAL FIELD

The present disclosure relates generally to three-dimensional modelling of a real-world environment; and more specifically, to generating point cloud map of one or more objects in a real-world environment.

BACKGROUND

With the advancements in the field of computer vision and range data processing, the visualization of the objects in a real-world environment is gaining popularity. The information extracted from the digital modelling of an object, surface or environment is used to derive meaningful interpretations. A digital representation of the environment have useful application in many fields, such as digital imaging, computer animation, special-effects in film, prototype imaging in marketing and product development, topography, reconstructive and plastic surgery, dentistry, industrial design, anthropology, milling and object production, biology, internal medicine, air traffic control management (for example, to model airspace surrounding an airport), architecture (for example, for modelling building, bridges, and so forth), military (for example, to depict topographical models of battlefields), and the like.

Several techniques have been developed to digitally represent an environment. Typically, devices such as Light Detection and Ranging (LIDAR) sensors are employed for capturing the objects of an environment. However, capturing a complete environment generally requires multiple range images from different viewpoints. Once these images are acquired, the various images must be combined (registered) either manually; or by utilizing algorithms, such as the Iterative Closest Point (ICP) algorithm to align two related captured images (or, point clouds), that are combined together to represent the environment. Such algorithms employ various techniques known in the art for alignment of two or more captured images to obtain the complete environment. However, the conventional techniques employed for alignment do not provide a measure of the accuracy achieved after registration. This might lead to unreliable data representing the environment in addition this might lead to wasted computing resources since storing unreliable data consumes storage space unnecessarily. Further if unreliable data is used for end application such as automatic vehicle it might lead accidents.

Therefore, in the light of the foregoing discussion, there exists a need to overcome the aforementioned drawbacks associated with the alignment of two captured point clouds.

SUMMARY

The present disclosure seeks to provide a system for generating a point cloud map of one or more objects in a real-world environment. The present disclosure also seeks to provide a method for generating a point cloud map of one or more objects in a real-world environment. The present disclosure seeks to provide a solution to the existing problem of errors arising while aligning and registration of two or more point clouds. An aim of the present disclosure is to provide a solution that overcomes at least partially the problems encountered in prior art, and provides an efficient, robust, computationally fast system for generating point cloud maps for one or more objects with enhanced accuracy.

Additionally, the present disclosure aims at eliminating manual intervention in generation of point clouds and thereby reducing the possibility of errors arising thereby.

In one aspect, an embodiment of the present disclosure provides a system for generating a point cloud map of one or more objects in a real-world environment, the system comprising:
 at least one data acquisition device for acquiring a plurality of data points representing one or more objects, wherein the at least one data acquisition device is configured to:
  acquire a first set of data points for the one or more objects from a first position to generate a first point cloud, and
  acquire a second set of data points for the one or more objects from a second position to generate a second point cloud;
 a server arrangement communicatively coupled to the data acquisition device, wherein the server arrangement comprises:
  a receiving module configured to receive the first point cloud and the second point cloud from the data acquisition device;
  a registration module configured to register the received first point cloud and the received second point cloud to generate a point cloud pair which is aligned; and
  a data processing module configured to:
  determine a quality score for the generated point cloud pair,
  compare the determined quality score with a predefined threshold value, and
  generate a point cloud map using the first point cloud and the second point cloud if the determined quality score is less than a predefined threshold value.

In another aspect, the present disclosure provides a method for generating a point cloud map of one or more objects in a real-world environment, the method comprising:
 acquiring a first set of data points for the one or more objects from a first position to generate a first point cloud;
 acquiring a second set of data points for the one or more objects from a second position to generate a second point cloud;
 registering the first point cloud and the second point cloud to generate a point cloud pair which is aligned;
 determining a quality score for the generated point cloud pair;
 comparing the determined quality score with a predefined threshold value; and
 generating a point cloud map using the first point cloud and the second point cloud if the determined quality score is less than a predefined threshold value.

Embodiments of the present disclosure substantially eliminate or at least partially address the aforementioned problems in the prior art, and enables truthful and accurate generation of a point cloud map of the objects in the real-world environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for generating a point cloud map of one or more objects in a real-world environment, the system comprising:
 at least one data acquisition device for acquiring a plurality of data points representing one or more objects, wherein the at least one data acquisition device data acquisition device is configured to:
 acquire a first set of data points for the one or more objects from a first position to generate a first point cloud, and
 acquire a second set of data points for the one or more objects from a second position to generate a second point cloud;
 a server arrangement communicatively coupled to the data acquisition device, wherein the server arrangement comprises:
 a receiving module configured to receive the first point cloud and the second point cloud from the data acquisition device;
 a registration module configured to register the received first point cloud and the received second point cloud to generate a point cloud pair which is aligned; and
 a data processing module configured to:
 determine a quality score for the generated point cloud pair,
 compare the determined quality score with a predefined threshold value, and
 generate a point cloud map using the first point cloud and the second point cloud if the determined quality score is less than a predefined threshold value.

In another aspect, the present disclosure provides a method for generating a point cloud map of one or more objects in a real-world environment, the method comprising:
 acquiring a first set of data points for the one or more objects from a first position to generate a first point cloud;
 acquiring a second set of data points for the one or more objects from a second position to generate a second point cloud;
 registering the received first point cloud and the received second point cloud to generate a point cloud pair which is aligned;
 determining a quality score for the generated point cloud pair;
 comparing the determined quality score with a predefined threshold value; and
 generating a point cloud map using the first point cloud and the second point cloud if the determined quality score is less than a predefined threshold value.

The present disclosure provides a system for generating point cloud map of one or more objects in a real-world environment in an accurate and efficient manner. In particular, the present disclosure provides a metric for registration of two point clouds. Herein, the determined quality score provides the metric to verify whether point clouds are successfully registered. It may be appreciated that the generated point clouds can be utilized for three-dimensional modelling in various fields, such as autonomous vehicle driving systems.

Throughout the present disclosure, the term "point cloud" refers to a collection of points of one or more objects described in a three-dimensional (3D) coordinate system that describes one or more objects in a three-dimensional scene/space. Typically, the points in a point cloud represent surfaces of objects, such as an external surface. The points in a point cloud, typically represent a complete set of (x, y, z) locations that represent the shape of an object. The point clouds may be used for performing various operations such as, for example, object identification, object classification, scene visualization, segmentation, two-dimensional image data enhancement, and/or other types of operations. It will be appreciated that the point cloud can be generated using a variety of data acquisition devices that scan the location to identify one or more points of the object, wherein each identified point is represented as a polar coordinate, since the angle between the data acquisition device and the object and distance from the data acquisition device to the object can be determined. The polar coordinates are then converted to 3D Cartesian coordinates and stored along with a corresponding intensity or colour value for the data point collected by the data acquisition device. Hereinafter, the term "data point" is used to refer each point scanned by the data acquisition device containing location information along with additional information such as intensity, colour and the like.

Throughout the present disclosure the term "point cloud map" refers to an organized collection of point clouds that meaningfully represent an object or a scene. Generally, two or more point clouds are aligned and registered together by employing various registration techniques to generate a complete view of the targeted object, scene or environment. Furthermore, in order to obtain the complete point cloud map of the scanned object or environment, it is necessary to integrate the part of the surface point cloud data obtained from different positions and angles. Moreover, two or more point clouds are registered to find a 3D transformation, so that the 3D coordinates of the point cloud at different angles can be correctly matched and overlapped to obtain the complete three-dimensional view or model of the targeted object, scene or environment, which is represented using the point cloud map.

According to an embodiment, the system comprises a data acquisition device configured to acquire a plurality of data points representing one or more objects in a real-world environment. Throughout the present disclosure, the term "data acquisition device" refers to scanning devices that produce digital data in the form of point cloud representing an object or a scene in a real-world environment. Typically, the data acquisition device refers to a collection of one or more programmable and/or non-programmable components that are configured to capture data describing one or more features of a real-world object or environment. The data describing one or more features of a real-world object or environment refers to information that can be used to construct digital, three-dimensional models useful for a wide variety of applications. In an example, the programmable component may be a laser scanner, such as Light Detection and Ranging (LiDAR). The LiDAR performs controlled steering of laser beams with a laser rangefinder to capture data describing a feature, namely a distance measurement at every direction of the real-world object, thereby capturing the surface shape of the real-world object. Herein, the data acquisition device is configured in a manner that the data acquisition device captures the data (distance measurement) related to the real-world object from different viewing angles, or the admixing of other known constraints for constructing a three-dimensional model, namely a non-contact three-dimensional model of the real-world object. It will be appreciated that, the data captured by the data acquisition device is processed by one or more computer program or routines for generating the three-dimensional model of the real-world environment.

The data acquisition device is configured to acquire a first set of data points for the one or more objects from a first position to generate a first point cloud. Further, the data acquisition device is configured to acquire a second set of data points for the one or more objects from a second position to generate a second point cloud. Notably, the first point cloud from the first position encompasses information about a portion of the targeted object, and the second point cloud encompasses information about another portion of the targeted object, wherein the two portions overlap each other. In an example, for acquiring data points for an object, the first point cloud may represent a portion of the object from a left view and the second point cloud may represent a portion of the object from a right view.

It will be appreciated that the terms "first point cloud" and "second point cloud" should not unduly limit the scope of the claims herein. The terms "first point cloud" and "second point cloud" are only indicative of two point clouds to be registered to generate a point cloud map. It shall be understood that the data acquisition device can be configured to acquire as many point clouds as required for generating the point cloud map. Hereinafter, for the sake of simplicity and clarity, any two point clouds to be registered from the multitude of acquired point clouds are termed as "first point cloud" and "second point cloud" without any limitations.

According to an embodiment, the system comprises two data acquisition devices arranged at two different positions, wherein one of the two data acquisition device is configured to acquire the first point cloud and other of the two data acquisition device is configured to acquire the second point cloud. Optionally, a plurality of data acquisition devices may be arranged at a plurality of positions to acquire a multitude of point clouds pertaining to one or more objects in a real-world environment. In an example, a number of data acquisition devices may be employed around a border or boundary stretched over a vast expanse for imaging and detection of objects in and around the border by generating point cloud map for the area under surveillance. Notably, the first point cloud and the second point cloud may be acquired at the same instant of time by employing two data acquisition devices arranged at two different positions and in sync with each other.

The data acquisition devices include, but are not limited to, one or more of a LiDAR (Light Detection and Ranging), a RADAR (Radio Detection and Ranging), 3D Scanner (Three-dimensional Scanner) and a camera. In an example, the data acquisition device is a LiDAR that transmits a LASER output, such as a pulse into the real-world environment. Subsequently, the LiDAR will receive a reflection of this LASER output from an object in the real-world environment, and the LiDAR receiver will process the received reflection to determine a distance to such an object (range information). Such several reflections from the objects in the real-world environment constitute data points. Further, an organized collection of such plurality of data points generate a point cloud.

According to another embodiment, the system comprises one data acquisition device mounted on a vehicle operable to move between the first position and the second position, wherein the data acquisition device is configured to acquire the first point cloud when the vehicle is at the first position and the second point cloud when the vehicle is at the second position. Herein, the first point cloud and the second point cloud are acquired consecutively in time by employing a same data acquisition device which is configured to move from the first position to the second position. Optionally, the data acquisition device is configured to have a relative motion with respect to the one or more objects in a real-world environment to acquire the first point cloud when at the first position and the second point cloud when at the second position. In an example, the data acquisition device may be mounted on an Unmanned Aerial Vehicle (UAV), a Micro Aerial Vehicle (MAV), a driven vehicle, an autonomous vehicle, an autonomous robotic system and the like to acquire point clouds pertaining to objects from a plurality of positions.

In some embodiments, the data acquisition device is fixed at one position and is configured to rotate to scan the objects around thereof. For example, the data acquisition device may be mounted on a traffic signal, operable to rotate and scan the traffic status around the signal, and therefrom monitor and control the traffic status by generating point cloud maps to estimate the vehicular movement around the signal.

Optionally, the system comprises a database arrangement configured to store the first point cloud and the second point cloud acquired by the data acquisition device. Notably, the database arrangement is communicatively coupled to the server arrangement and the data acquisition device. Generally, the term "database arrangement" refers to hardware, software, firmware, or a combination of these for storing point clouds in an organized (namely, structured) manner, thereby, allowing for easy storage, access (namely, retrieval), and analysis of point clouds. The term "database" also encompasses database servers that provide the aforesaid database services to the system for generating point clouds.

According to an embodiment, the system comprises a server arrangement communicatively coupled to the data acquisition device. The server arrangement is configured to receive and process the first point cloud and the second point cloud to generate the point cloud map. The server arrangement comprises a receiving module, a registration module and a data processing module. It will be appreciated that the server arrangement can be implemented in several ways. In an example, the receiving module, the registration module and the data processing module may be executed in a single computing device. In another example, the receiving module, the registration module and the data processing module may be executed in a distributed computing arrangement. In yet another example, the server arrangement could be implemented by way of a cloud server arrangement.

Notably, the components of the system are in communication with each other via a communication network. It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks. Generally, the term "internet" relates to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc.). The term is also intended to encompass non-public networks such as private (e.g., corporate) Intranets.

According to an embodiment, the receiving module is configured to receive the first point cloud and the second point cloud acquired by the data acquisition device. Optionally, the receiving module is also equipped with specialized filters to filter out the unwanted noise and clutter associated with the point clouds acquired by the data acquisition devices. For instance, the point clouds received by the receiving module may be distorted due to multiple reflections or echoes from the environment or some other natural causes of distortion, such as scattering, dispersion, attenuation and the like. In such a case, the receiving module is configured to filter the unwanted noise and clutter to obtain undistorted point clouds for further processing.

According to an embodiment, the registration module is configured to register the received first point cloud and the received second point cloud to generate a point cloud pair which is aligned. The generated point could pair might be registered. An example of aligning is by aligning each of the data points in the first point cloud to each of the corresponding data points in the second point cloud. The registration module computes a transformation matrix to align the first point cloud and the second point cloud. The transformation matrix contains translation coefficients and rotation coefficients to be applied on the first point cloud and the second point cloud to register and generate a point cloud pair. Notably, a variety of registration techniques may be employed for registering the first point cloud and the second point cloud to generate the point cloud pair. Notably, the transformation matrix is generated for a pairwise registration, wherein each of the point cloud pair is registered corresponding to a different transformation matrix. Further, the transformation matrix is generated for a multi-view registration, wherein a global matrix is computed for the all the generated point cloud pairs to generate the point cloud map for the object or scene. Generally, the registration techniques include coarse registration techniques and fine registration techniques. The coarse registration techniques refer to registration based on point, line and surface features. For example, in LiDAR point cloud registration, these features may include building corners, contours, road networks, roof patches, and the like. Furthermore, fine registration are iterative approximation methods, random sample consensus methods, normal distributions transform methods, and the like. In an example, the Iterative Closest Point (ICP) algorithm is employed for registration of the first point cloud and the second point cloud. For the ICP algorithm initial location estimates are needed. A number of data points are selected from the first point cloud to be registered, and the data points corresponding to data points in the second point cloud are then identified. The transformation matrix is obtained by minimizing the error between the selected data points in the first point cloud and in the second point cloud. Repeated iterations are performed until the registration point cloud pair is obtained.

According to an embodiment, the data processing module is configured to determine a quality score for the generated point cloud pair. Herein, the quality score is determined based on an error values calculated by determining summation of the squared distances between the data points in the first point cloud to the corresponding closest points in the second point cloud within a defined radii. Optionally the data processing module employs an algorithm of robust statistics to generate a dynamic radius value on the distance allowed between the closest data points from the first point cloud to the second point cloud. Therefore, instead of calculating distances for all the data points in the first point cloud to the corresponding closest data points in the second point cloud, only the data points within the defined radius are calculated and analysed. Further, the data processing module is configured to choose the data point pairs from the first point cloud and the second point cloud that will be evaluated. Thus, each data point in the first point cloud whose distance to its closest data point in the second point is less than the defined radius is retained. Thereafter, the error value is calculated for the retained data point pairs. Such a system for calculating error value ensures higher accuracy of alignment, and thus higher successful registrations. This also makes the present system capable of registering partially overlapping data sets in the point cloud while reducing the needed computational power at the same time. Further, as the quality metrics related to embodiments give indication which registrations are viable in a reliable matter, the process, according to embodiments makes it possible to register thousands of clouds is faster using less computational power. It will be appreciated that the value of radii defined for the point cloud pair is dynamic in nature. In other words, the radii defined is different for different point cloud pairs depending upon the nature of point clouds to be registered.

In an embodiment, the quality score is determined based on error values for the generated point cloud pair, wherein the error value is calculated by a mathematical formula:

$$E(r) = \sqrt{\Sigma_{x \in S_r}(d(x,T))^2/|S_r|},$$

wherein 'S' represents the first point cloud, 'T' represents the second point cloud, 'x' represents the data points in the point cloud '$S_r$', d(x,T) is the distance from each data point 'x' in the first point cloud '$S_r$' to the closest data point in the second point cloud 'T', 'r' represents radius defined for pairing of each of the plurality of data points in the first point cloud 'S' to the corresponding data point in the second point cloud 'T', and $S_r$ represents set of all data points 'x' from the first point cloud 'S' satisfying d(x,T)<r.

In an embodiment, the quality score is determined by assessing the shape of the error function. Further, in an embodiment, the data processing module is configured to calculate a rate of change (in an embodiment the rate of change is positive i.e. increasing) of the error value for the generated point cloud pair between corresponding pairs of data points thereof. The rate of increase of the error value is determined by approximating a derivative value at regular intervals for the error function. In such embodiment, the quality score is one error value, provided that the rate of increase is small enough everywhere. In deed according to additional or alternative embodiment the quality score is a context dependent 'r' if the rate of change of the error value is less than a predetermined change threshold value. In such case the value of 'r' is typically small.

As an example the error function E is the root mean square error of all distances smaller than r, from S to closest point in T. In such a case E is increasing function but stops increasing at some point. The rate of increase of the function is of particular interest. If the rate of increase at any point is larger than a context dependent threshold value L, this indicates a misalignment. In this case no quality score is provided or needed. Thus approximate the derivative E' at regular intervals, and if one of them is bigger than a properly chosen threshold value L, there is a misalignment. If E' is below the threshold everywhere, this indicates that there is no big error in the alignment, and E(r) with some context dependent small number r can be used as the quality score. If this quality score is smaller than a predefined threshold, then the alignment is correct. In practice the context dependent parameters described above depend on the scale of the point clouds (small objects, indoors, tunnels, open area), and some study is needed to determine those for each use case.

According to an embodiment, the data processing module is configured to compare the calculated quality score with a predefined threshold value. Further, a point cloud map is generated using the first point cloud and the second point cloud if the determined quality is less than a predefined threshold value. Notably, the threshold value is defined based on at least one of the one or more objects and the real-world environment. It may be appreciated that there may be significant differences in threshold values for different scenarios due to wide range of applications of the present system. For example, in small-scale digital archiving of cultural heritage sites, the threshold value for point cloud registration is generally small, and thus the quality score also has to be low enough. In contrast, in large-scale geographical applications, due to diversity of surface topology and morphology, the threshold value for point cloud registration is comparatively high, and thus even a relatively high quality score may be sufficient. After performing registration of the first point cloud and the second point cloud, using any suitable registration technique, it may therefore be a prerequisite to calculate the quality score of the generated point cloud pair and perform the comparison with predefined threshold value, in order to select the suitable generated point cloud pairs for generating final point cloud map.

Notably, the quality score is a qualitative measure of the degree of alignment of the first point cloud and the second point cloud. Furthermore, the quality score is a metric to determine whether the registration process is successful or unsuccessful. It is to be noted that the failure in the registration process can occur due to a number of reasons, such as when the overlap between the two surfaces is insufficient, when the range measurement error (i.e. the unambiguous range) is too large, or when the geometric constraint on the 3D rigid-body transformation between the two surfaces is insufficient (for example, when a plane is being registered to another plane) or when the initial relative position between the two surfaces is large.

According to another embodiment, the data processing module is configured to compare the calculated error value with a predetermined threshold value to determine whether the registration process is successful or unsuccessful. When the calculated error value is less than the predetermined threshold value, the registration process is successful and the point cloud map is generated using the first point cloud and the second point cloud. Further, when the calculated error value exceeds the predetermined threshold value, the registration is unsuccessful. The data processing module is configured to compare the aforementioned derivative of the error function at regular intervals with the predefined threshold. The derivative of the error function is compared with the predetermined threshold at each interval. When the derivative of the error value is less than the predetermined threshold at each of the intervals for which derivative is approximated, the two points clouds are aligned successfully and the registration process is successful. Further, when the derivative of the error value exceeds the predetermined threshold in at least one of the intervals for which derivative is calculated, the two point clouds are misaligned and the registration process is unsuccessful.

According to an embodiment, the data processing module is further configured to instruct the registration module to register the first point cloud and a third point cloud to generate another point cloud pair if the determined quality score is bigger than the predefined threshold value. Notably, if the previously determined quality score is bigger than the predefined threshold value, that indicates there is a misalignment in the first point cloud and the second point cloud which could lead to a failure in the registration of two point clouds. Since the data acquisition device is configured to acquire a plurality of point clouds from different positions, in case of failure of registration of the first point cloud and the second point cloud, the data processing module instructs the registration module to register the first point cloud and the third point cloud to generate another point cloud. The process of registration of two point clouds continues until the required number of successful registrations is achieved and the point cloud map is successfully generated. Therefore, such a system ensures that the generated point cloud map is an accurate and truthful depiction of the objects being modelled. Further, the computational power of the system is reduced considerably as only selective point clouds are registered to generate the point cloud map.

In an example, there may be a series of 5 point clouds, namely point cloud 1, point cloud 2, point cloud 3, point cloud 4 and point cloud 5, acquired via the data acquisition device representing an object. Further, it may be defined that the system needs only two number of successful registrations for generating required point cloud map. In such an example, the registration module registers the point cloud number 1 (first point cloud) with, say, the point cloud number 2 (second point cloud), and further, the point cloud number 3 (first point cloud) with, say, the point cloud number 4 (second point cloud); or alternatively, the point cloud pair (first point cloud) from the point cloud number 1 and the point cloud number 2 with, say, the point cloud number 3 (second point cloud); and if both the registrations may be successful, there is no need to analyse the remaining point clouds, thus considerably reducing the computational power. Further, when the registration is unsuccessful, the registration module registers point cloud number 2 (first point cloud) with, say, point cloud number 4 (second point cloud), and point cloud number 3 (first point cloud) with point cloud number 5 (second point cloud) until the required number of successful registrations are achieved. It will be appreciated that the first point cloud and second point cloud need not be consecutive point clouds in the series of five acquired point clouds. In some examples, the present disclosure also provides a process to compare various registration techniques and select the best registration technique based on the determined quality score for a particular modelling application.

In an exemplary implementation, the generated point cloud map is implemented for autonomous driving of a vehicle. The data acquisition device such as, a LiDAR is mounted on the vehicle, wherein the LiDAR is configured to rotate to scan the one or more objects in the real-world environment. The data acquisition device acquires a plurality of data points pertaining to objects such as vehicles, trees, barricades, boulders, and traffic cones. Notably, as the LiDAR is configured to rotate, a plurality of point clouds are acquired from the objects in the real-world environment. Furthermore, the LiDAR acquires a plurality of set of data points for the one or more objects from different positions to generate a plurality of point clouds representing the real-world environment. Optionally, the plurality of point clouds are stored in database arrangement. Further, the receiving module is configured to select a first point cloud and a second point cloud from a plurality of point clouds stored in the database arrangement. Further, the registration module is configured to register the received first point cloud and the received second point cloud to generate a point cloud pair which is aligned. Example of alignment is by aligning each of the data points in the first point cloud to each of the corresponding data points in the second point cloud. Further, the data processing module is configured to determine a quality score for the generated point cloud pair. The determined quality score is compared with a predefined threshold value. When the determined quality score is below a predefined threshold value, a point cloud map using the first point cloud and the second point cloud is generated. The point cloud map represents the objects in the real-world environment and such generated point cloud map can be implemented for creating virtual maps, and thereby employed for autonomous driving of vehicles. As an example the generated point cloud map can be used for controlling autonomous vehicle. Based on additional or alternative embodiment the predetermined threshold value can be varied depending on driving conditions of the autonomous vehicle. As an example of the driving conditions can be speed, weather, congestion, time of day, time of year, road type or alike. For example if a speed of the autonomous vehicle is high (or for example if weather conditions are bad) the predetermined threshold value can be a varied to ensure more accurate point could map to be used if needed.

The present disclosure also relates to the method of generating data visualization. Various embodiments and variants disclosed above apply mutatis mutandis to the method.

Optionally, the method further comprises calculating an error value for the generated point cloud pair:

$$E(r) = \sqrt{\Sigma_{x \in S_r}(d(x,T))^2/|S_r|},$$

wherein 'S' represents the first point cloud, 'T' represents the second point cloud, 'x' represents the data points in the first point cloud '$S_r$', d(x,T) is the distance from each data point 'x' in the first point cloud '$S_r$' to the closest data point in the second point cloud 'T', 'r' represents radius defined for pairing of each of the plurality of data points in the first point cloud 'S' to the corresponding data point in the second point cloud 'T', and $S_r$ represents set of all data points 'x' from the first point cloud 'S' satisfying d(x,T)<r.

Optionally, the method further comprises registering the first point cloud and a third point cloud to generate and register another point cloud pair, if the determined quality score is bigger than the predefined threshold value.

DETAILED DESCRIPTION OF THE DRAWINGS

Figure 1:
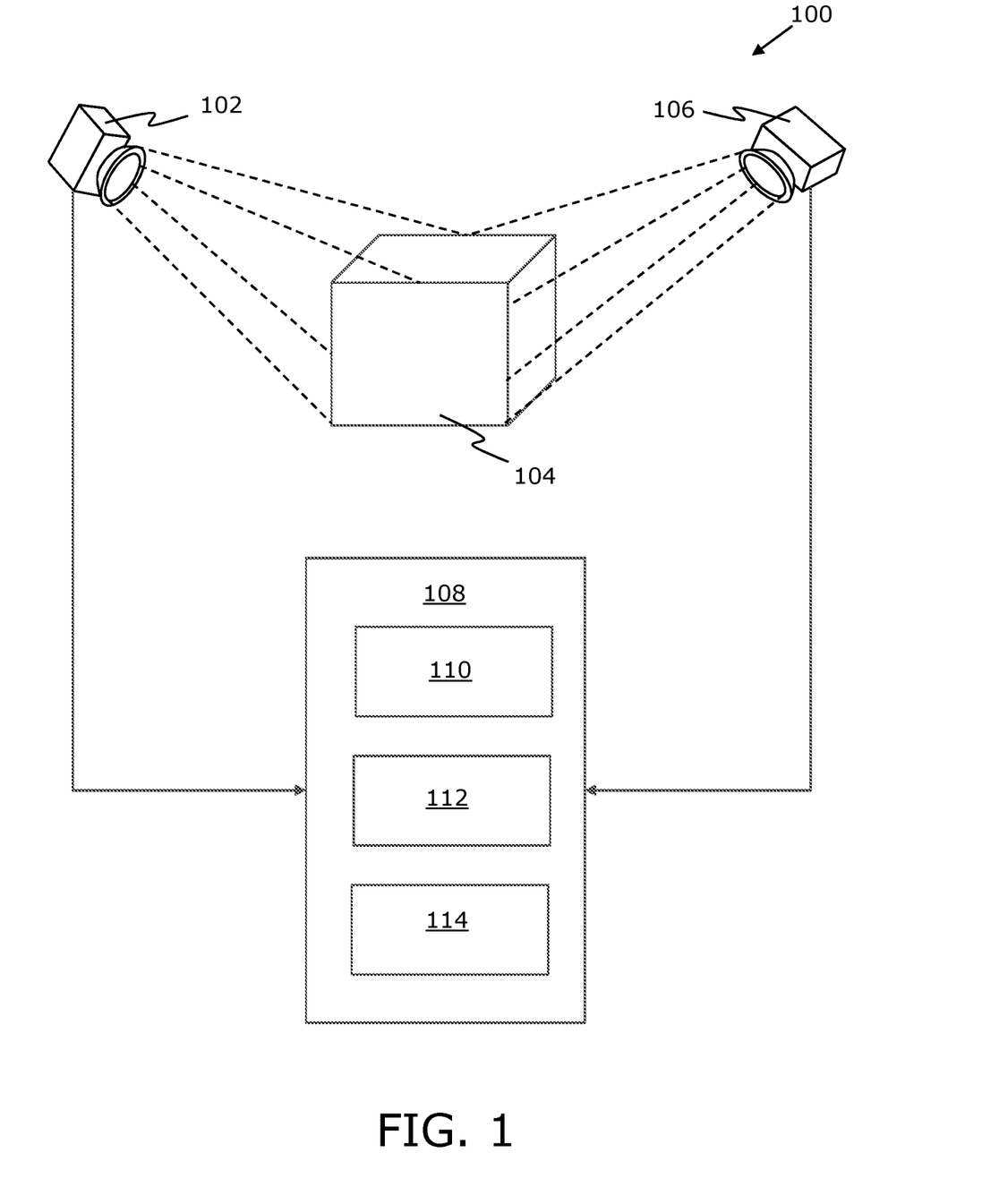
FIG. 1 is a schematic illustration of a system for generating point cloud map of one or more objects in a real-world environment, in accordance with an embodiment of the present disclosure.

Referring to FIG. 1, illustrated is a schematic representation of a system 100 for generating point cloud map of one or more objects in a real-world environment, in accordance with an embodiment of the present disclosure. As illustrated, the system 100 comprises a first data acquisition device 102 to acquire a first set of data points for the object 104 from a first position to generate a first point cloud, and a second data acquisition device 106 to acquire a second set of data points for the object 104 from a second position to generate a second point cloud. Further, the system 100 comprises a server arrangement 108 communicatively coupled to the first data acquisition device 102 and the second data acquisition device 106. Notably, the server arrangement 108 comprises a receiving module 110 configured to receive the first point cloud and the second point cloud from the first data acquisition device 102 and the second data acquisition device 106 respectively; a registration module 112 configured to register the received first point cloud and the received second point cloud to generate a point cloud pair which is aligned, and a data processing module 114 configured to determine a quality score for the generated point cloud pair and generate a point cloud map of the one or more objects in the real-world environment.

Figure 2A:
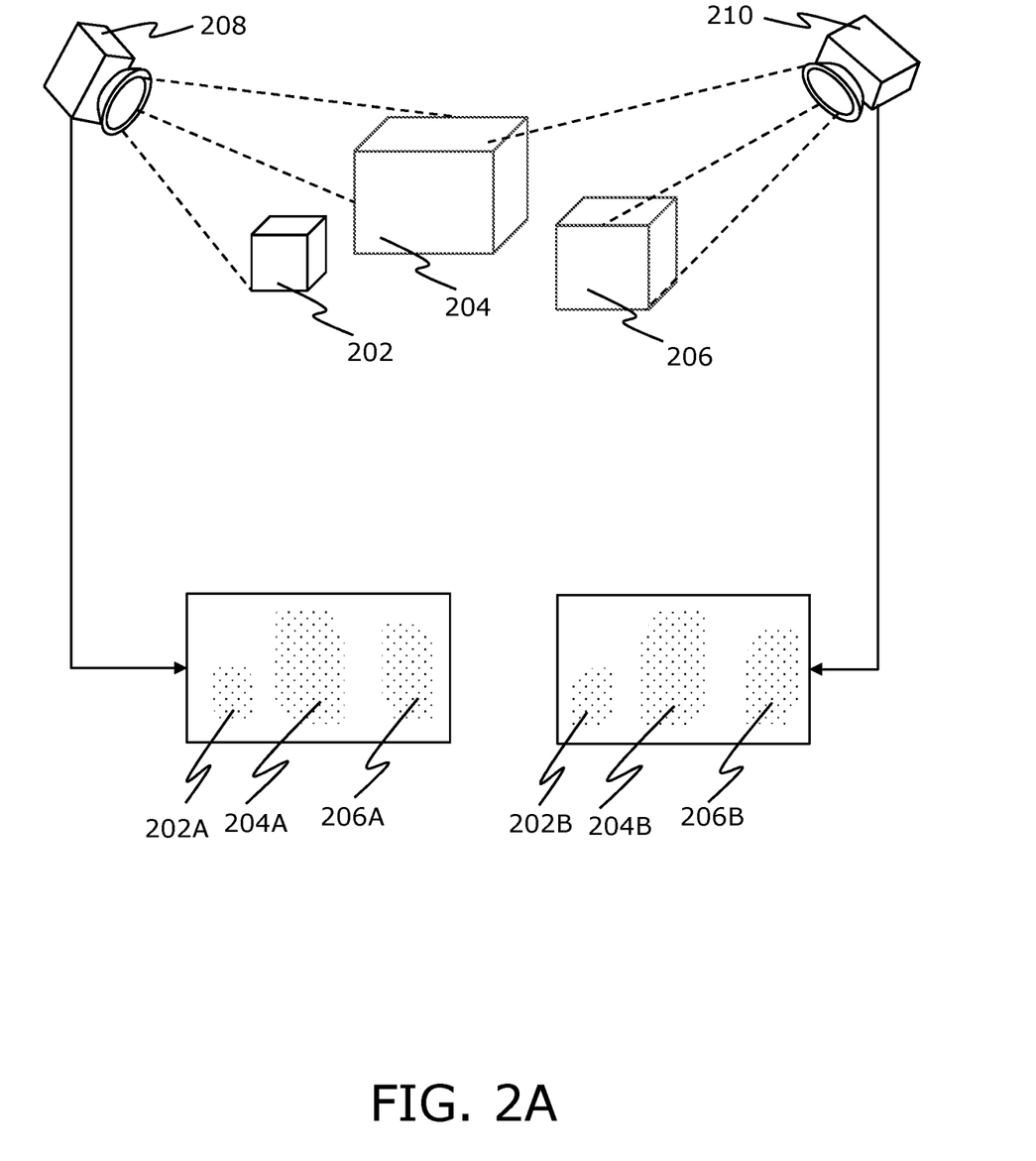
FIG. 2A and FIG. 2B are schematic illustrations of an exemplary implementation of a system for generating point cloud map of one or more objects in a real-world environment, in accordance with various embodiments of the present disclosure.

Referring to FIG. 2A, illustrated is a schematic representation of an exemplary implementation of two data acquisition devices, namely a first data acquisition device 208 and a second data acquisition device 210, acquiring point clouds for objects 202, 204 and 206, in accordance with an embodiment of the present disclosure. As illustrated, the first data acquisition device 208 is configured to acquire point clouds 202A, 204A, and 206A from a first position. Further, the second data acquisition device 210 is configured to acquire point clouds 202B, 204B, and 206B from a second position.

Figure 2B:
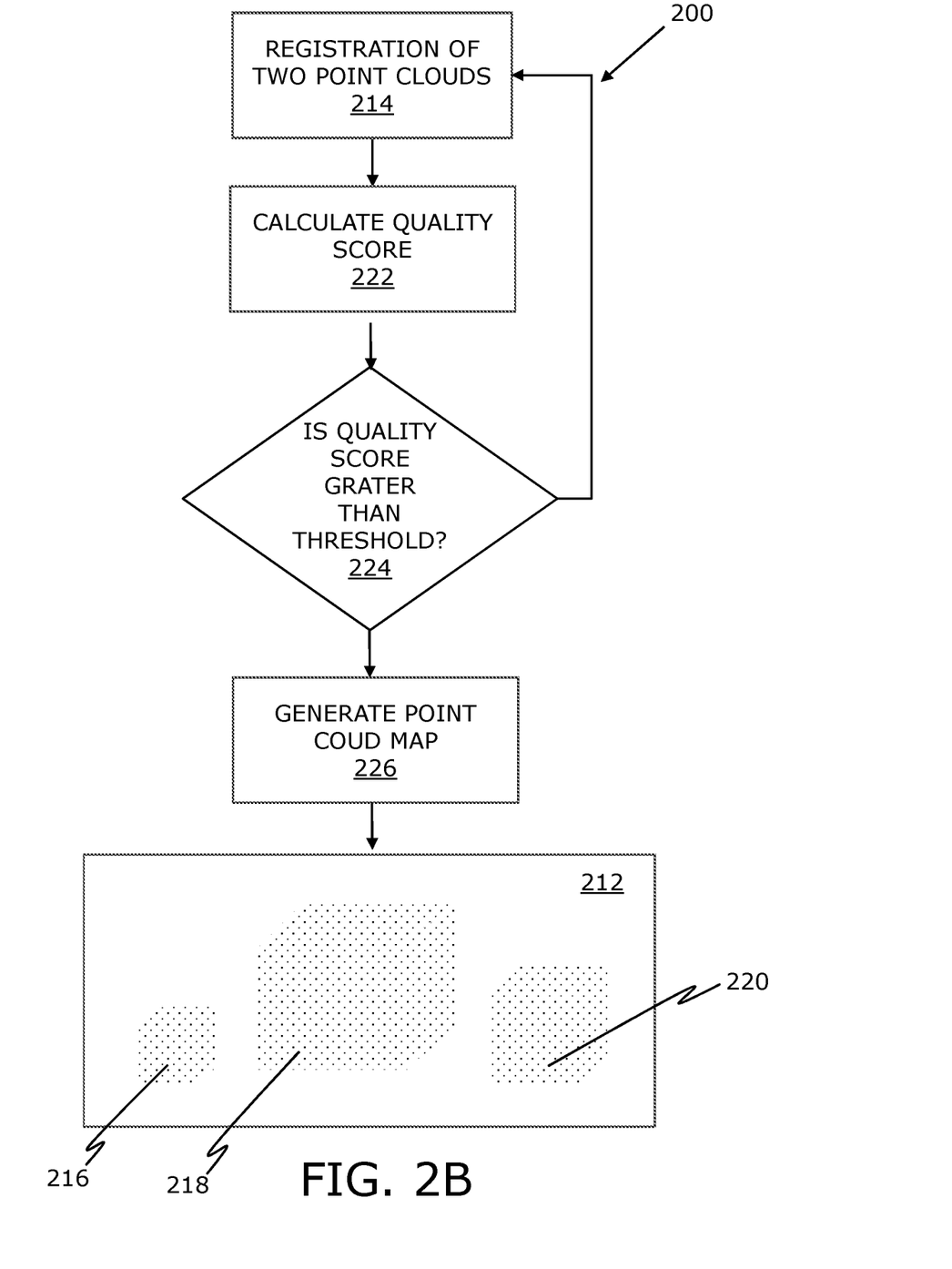

Referring to FIG. 2B, illustrated is a schematic representation of a process 200 for generating a point cloud map 212 of the objects 202, 204 and 206, in accordance with an embodiment of the present disclosure. As illustrated, at step 214, the received point clouds 202A, 204A, and 206A from the first data acquisition device 208 and the received point clouds 202B, 204B, and 206B from the second data acquisition device 210 (of FIG. 2A) are registered together by aligning each of the data points in the point clouds 202A, 204A, and 206A to each of the corresponding data points in the point clouds 202B, 204B, and 206B, respectively. Notably, the point cloud 202A is registered with point cloud 202B to generate a point cloud pair 216, the point cloud 204A is registered with point cloud 204B to generate a point cloud pair 218, the point cloud 206A is registered with point cloud 206B to generate a point cloud pair 220. Further, the point cloud pairs 206, 218 and 220 collectively generate the point cloud map 212. At step 222, a quality score is determined, by examining the error function, for each of the point cloud pairs 206, 218 and 220. At step 224, the calculated quality score(s) is compared with a predefined threshold value and a decision is made based on the comparison. As shown, step 226 is executed when the calculated quality score is less than the predefined threshold value, indicating a successful registration. At step 226, the point cloud map 212 is generated. When the calculated quality score bigger than the predefined threshold value, the steps 214, 222 and 224 are executed and repeated until the registration is successful.

Figure 3A:
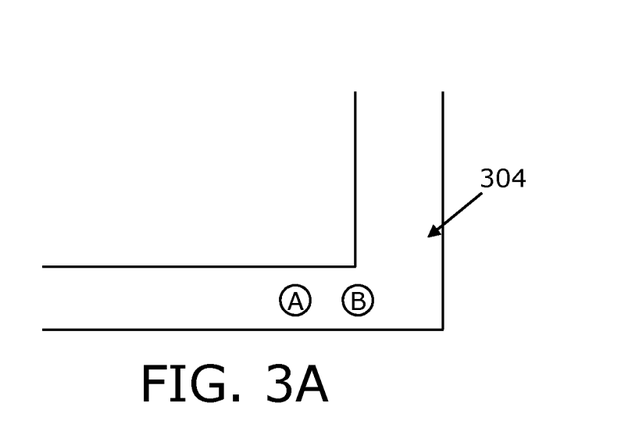
FIGS. 3A-3F are schematic illustrations of various steps involved in capturing and alignment of two point clouds, in accordance with various embodiments of the present disclosure.
Figure 3B:
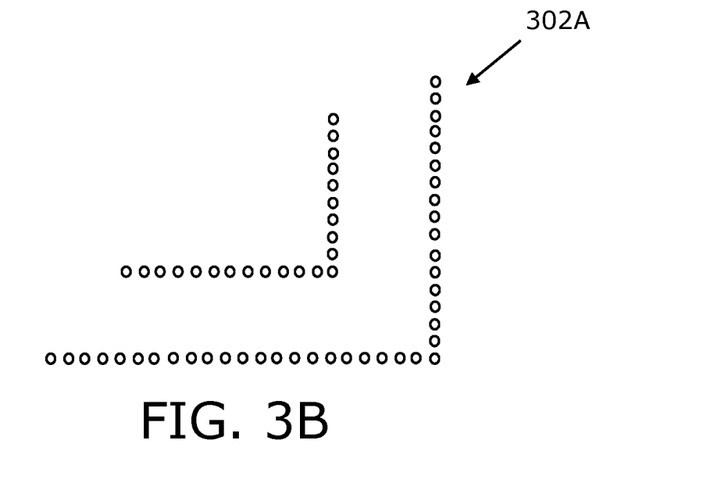
Figure 3C:
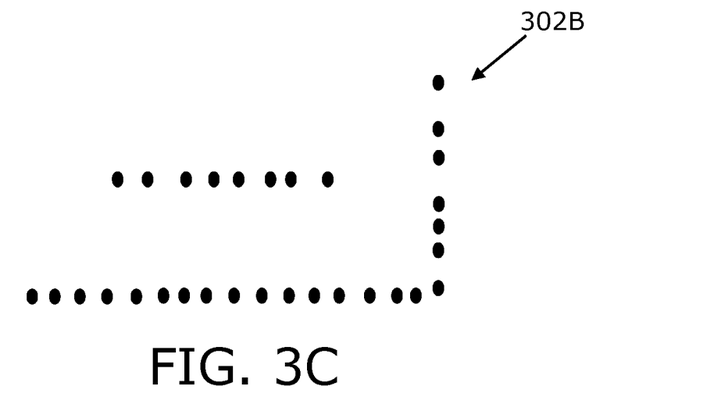

Referring to FIGS. 3A-3C in combination, illustrated are schematic representations of point clouds 302A and 302B generated for an L-shaped path 304, as acquired by at least one data acquisition device from two locations "A" and "B", in accordance with an exemplary implementation of the present disclosure. As illustrated, the L-shaped path 304 is scanned from the location "A" to generate the point cloud 302A and the L-shaped path 304 is scanned from the location "B" to generate the point cloud 302B.

Figure 3D:
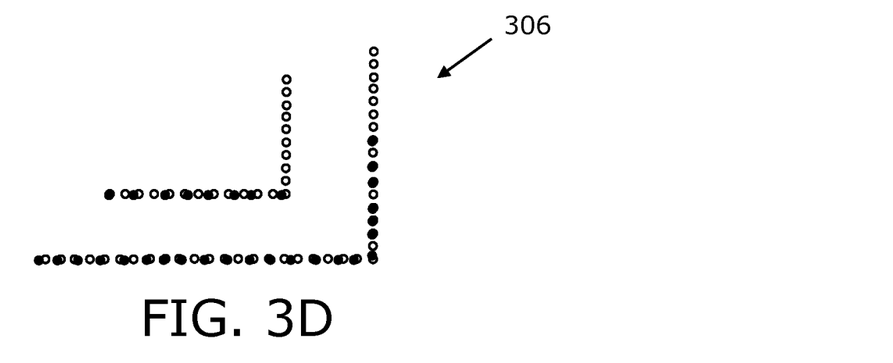
Figure 3E:
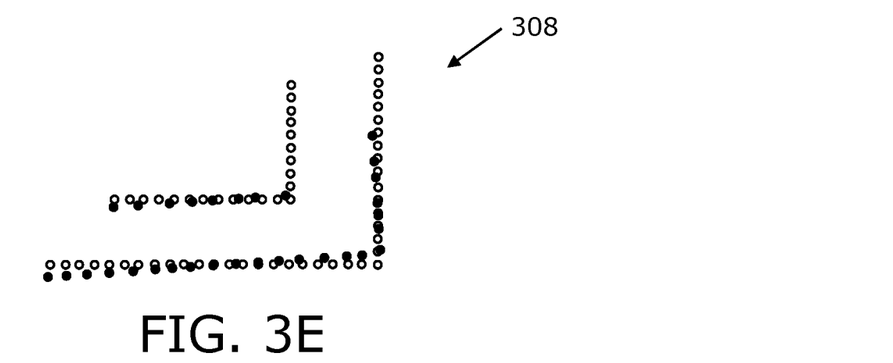
Figure 3F:
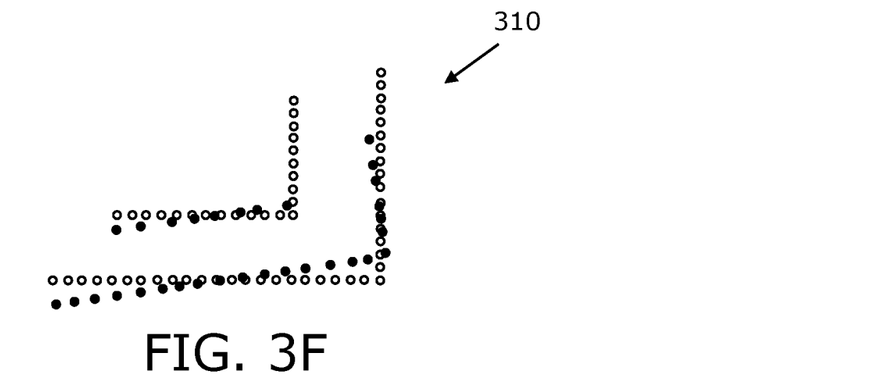

Referring to FIGS. 3D-3F in combination, illustrated are schematic representations of different scenarios of alignments of the point cloud 302A from the location "A" and the point cloud 302B from the location "B", in accordance with various exemplary implementations of the present disclosure. As illustrated in FIG. 3D, the point cloud map 306 is generated by aligning the data points from point cloud 302A to the corresponding data points in the point cloud 302B considering a defined radius which is small, and the error value is calculated. In this case, the quality score may be smaller than the predefined threshold value; and thus, the registration is considered successful. Further in 306, as the alignment is "correct" the error function does not grow too fast (i.e. it grows slower than predetermined threshold parameter of derivate of the growth). Further the value of the error function with the smallest r is less than the second threshold parameter. As illustrated in FIG. 3E, the point cloud map 308 is generated by aligning the data points in the point cloud 302A to the corresponding data points in the point cloud 302B considering a defined radius which is relatively higher, and the error value is calculated. In this case there is some error but the error function might not grow too fast (i.e. grows slower than predetermined threshold parameter of derivate of the growth). However the error value with the smallest r is too high. In this case the quality score is greater than the predefined threshold value; and thus, the registration is considered unsuccessful. As illustrated in FIG. 3F, the point cloud map 310 is generated by aligning the data points in the point cloud 302A to the corresponding data points in the point cloud 302B, and the error function is examined. In this case there is a big error in the alignment. The error value with the smallest r might be small enough (less than the predetermined second threshold parameter) but the growth rate of the error function is too fast leading to rejection (i.e. derivate is above predetermined threshold) In this case, the alignment is rejected and there is no need to calculate the quality score.

Figure 4:
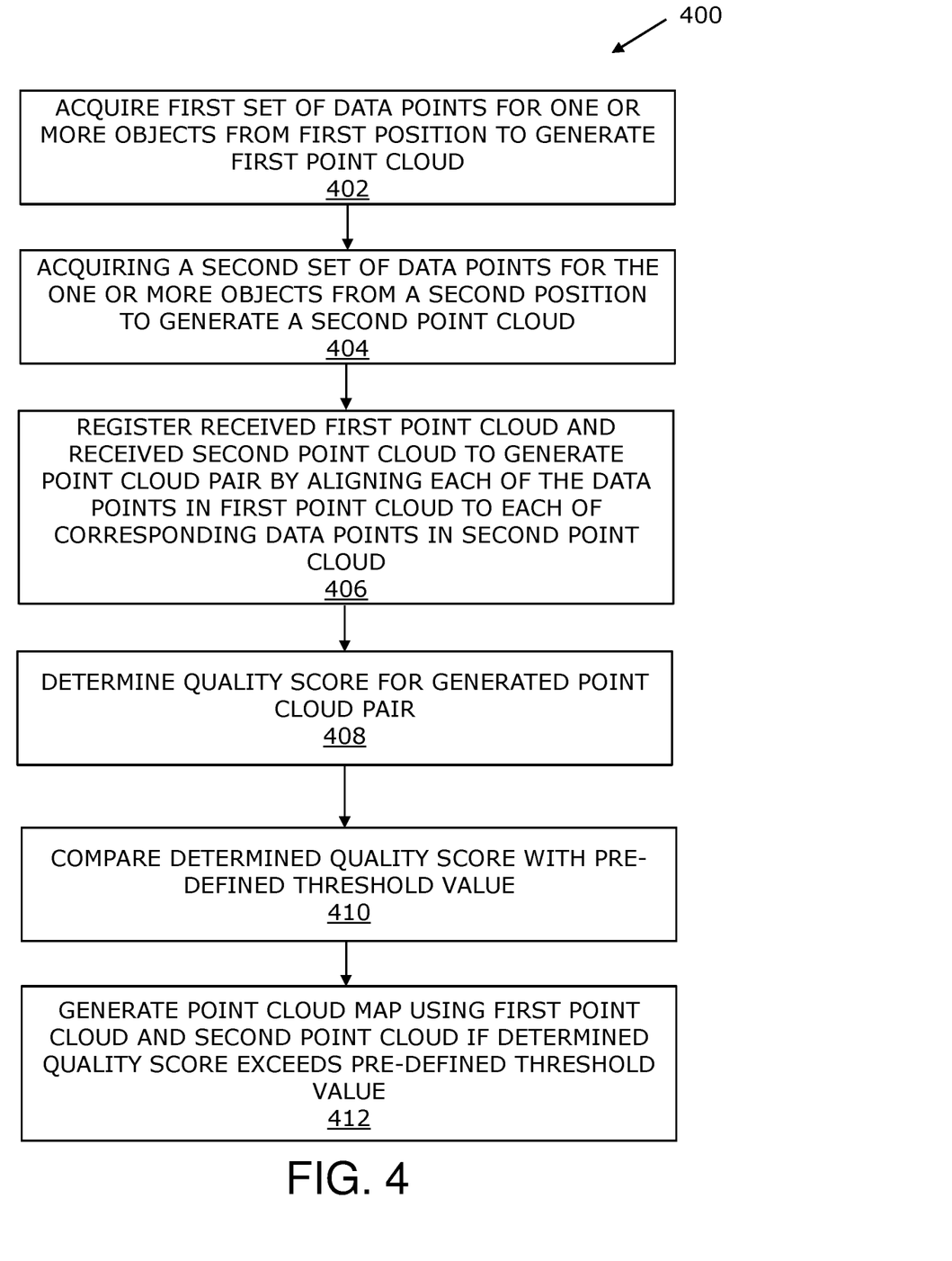
FIG. 4 is a schematic illustration of steps of a method for generating point cloud map of one or more objects in a real-world environment, in accordance with an embodiment of the present disclosure.

Referring to FIG. 4, illustrated are steps of a method 400 for generating point cloud map of one or more objects in a real-world environment, in accordance with an embodiment of the present disclosure. At step 402, a first set of data points is acquired for the one or more objects from a first position to generate a first point cloud. At step 404, a second set of data points is acquired for the one or more objects from a second position to generate a second point cloud. At step 406, the first point cloud and the second point cloud are registered to generate a point cloud pair by aligning each of the data points in the first point cloud to each of the corresponding data points in the second point cloud. At step 408, a quality score is determined for the generated point cloud pair. At step 410, the determined quality score is compared with a predefined threshold value. At step 412, a point cloud map is generated using the first point cloud and the second point cloud if the determined quality score is less than a predefined threshold value.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for generating a point cloud map of one or more objects in a real-world environment, the system comprising:
at least one data acquisition device for acquiring a plurality of data points representing one or more objects, wherein the at least one data acquisition device is configured to:
acquire a first set of data points for the one or more objects from a first position to generate a first point cloud, and
acquire a second set of data points for the one or more objects from a second position to generate a second point cloud;
a server arrangement communicatively coupled to the data acquisition device, wherein the server arrangement comprises:
a receiving module configured to receive the first point cloud and the second point cloud from the data acquisition device;
a registration module configured to register the received first point cloud and the received second point cloud to generate a point cloud pair which is aligned; and
a data processing module configured to:
determine a quality score for the generated point cloud pair,
compare the determined quality score with a predefined threshold value, and
generate a point cloud map using the first point cloud and the second point cloud if the determined quality score is less than a predefined threshold value;
wherein the data processing module is configured to determine the quality score based on an error value for the generated point cloud pair, calculated as:

$$E(r)=\sqrt{\Sigma_{x \in S_r}(d(x,T))^2/|S_r|},$$

and wherein 'S' represents the first point cloud, 'T' represents the second point cloud, 'x' represents the data points in the first point cloud '$S_r$', d(x,T) is the distance from each data point 'x' in the first point cloud '$S_r$' to the closest data point in the second point cloud 'T', 'r' represents radius defined for pairing of each of the plurality of data points in the first point cloud 'S' to the corresponding data point in the second point cloud 'T', and $S_r$ represents set of all data points 'x' from the first point cloud 'S' satisfying d(x,T)<r.

2. The system according to claim 1, wherein the data processing module is further configured to calculate a rate of change of the error value for the generated point cloud pair between corresponding pairs of data points thereof.

3. The system according to claim 1, wherein the quality score is an error value with a context dependent 'r' if the rate of change of the error value is less than a predetermined change threshold value.

4. The system according to claim 1, wherein the radius 'r' is defined based on at least one of the one or more objects and the real-world environment.

5. The system according to claim 1, wherein the threshold value is determined based on at least one of the one or more objects and the real-world environment.

6. The system according to claim 1, wherein the at least one data acquisition device comprises one or more of a LIDAR, a RADAR a 3D scanner and a camera.

7. The system according to claim 1, wherein the system comprises two data acquisition devices arranged at two different positions, and wherein one of the two data acquisition device is configured to acquire the first point cloud and other of the two data acquisition device is configured to acquire the second point cloud.

8. The system according to claim 1, wherein the system comprises one data acquisition device mounted on a vehicle operable to move between the first position and the second position, and wherein the data acquisition device is configured to acquire the first point cloud when the vehicle is at the first position and the second point cloud when the vehicle is at the second position.

9. The system according to claim 1, wherein the data processing module is further configured to instruct the registration module to register the first point cloud and a third point cloud to generate another point cloud pair if the determined quality score is less than the predefined threshold value.

10. The system according to claim 1, wherein the generated point cloud map is implemented for autonomous driving of a vehicle.

11. A method for generating a point cloud map of one or more objects in a real-world environment, the method comprising:
acquiring a first set of data points for the one or more objects from a first position to generate a first point cloud;
acquiring a second set of data points for the one or more objects from a second position to generate a second point cloud;
registering the first point cloud and the second point cloud to generate a point cloud pair which is aligned;
determining a quality score for the generated point cloud pair;
comparing the determined quality score with a predefined threshold value; and
generating a point cloud map using the first point cloud and the second point cloud if the determined quality score is less than a predefined threshold value;
wherein the data processing module is configured to determine the quality score based on an error value for the generated point cloud pair, calculated as:

$$E(r) = \sqrt{\Sigma_{x \in S_r}(d(x,T))^2 / |S_r|},$$

and wherein 'S' represents the first point cloud, 'T' represents the second point cloud, 'x' represents the data points in the first point cloud '$S_r$', d(x,T) is the distance from each data point 'x' in the first point cloud '$S_r$' to the closest data point in the second point cloud 'T', 'r' represents radius defined for pairing of each of the plurality of data points in the first point cloud 'S' to the corresponding data point in the second point cloud 'T', and $S_r$ represents set of all data points 'x' from the first point cloud 'S' satisfying d(x,T)<r.

12. The method according to claim 11, further comprising registering the first point cloud and a third point cloud to generate another point cloud pair, if the determined quality score exceeds the predefined threshold value.

13. The method according to claim 11, further comprising using the generated point cloud map for controlling autonomous vehicle.

14. The method according to claim 13, further comprising varying the predetermined threshold value based on driving conditions of the autonomous vehicle.

* * * * *